United States Patent
Alexander

(10) Patent No.: US 7,725,552 B2
(45) Date of Patent: May 25, 2010

(54) CONTENT AND SERVICE DELIVERY IN TELECOMMUNICATION NETWORKS

(75) Inventor: Louis G. Alexander, Richmond, VA (US)

(73) Assignee: Markport Limited, Dublin (IE)

( * ) Notice: Subject to any disclaimer, the term of this patent is extended or adjusted under 35 U.S.C. 154(b) by 118 days.

(21) Appl. No.: 12/087,860

(22) PCT Filed: Jan. 23, 2007

(86) PCT No.: PCT/IE2007/000005

§ 371 (c)(1),
(2), (4) Date: Jul. 16, 2008

(87) PCT Pub. No.: WO2007/086038

PCT Pub. Date: Aug. 2, 2007

(65) Prior Publication Data
US 2009/0013049 A1 Jan. 8, 2009

Related U.S. Application Data

(60) Provisional application No. 60/761,357, filed on Jan. 24, 2006.

(51) Int. Cl.
*G06F 15/16* (2006.01)
*G06F 12/00* (2006.01)
(52) U.S. Cl. ...................... 709/206; 709/207
(58) Field of Classification Search ............. 709/206, 709/207, 217–218, 223–229, 250
See application file for complete search history.

(56) References Cited

U.S. PATENT DOCUMENTS

| | | | |
|---|---|---|---|
| 7,058,036 B1 * | 6/2006 | Yu et al. | 370/335 |
| 7,617,459 B2 * | 11/2009 | Ho et al. | 715/762 |
| 2002/0184089 A1 | 12/2002 | Tsou et al. | |
| 2003/0158902 A1 | 8/2003 | Volach | |
| 2004/0103157 A1 * | 5/2004 | Requena et al. | 709/206 |
| 2007/0073823 A1 * | 3/2007 | Cohen et al. | 709/207 |
| 2007/0143423 A1 * | 6/2007 | Kieselbach et al. | 709/206 |

FOREIGN PATENT DOCUMENTS

| | | |
|---|---|---|
| EP | 1 320 229 | 6/2003 |
| WO | WO 02/065250 | 8/2002 |

* cited by examiner

OTHER PUBLICATIONS

International Search Report dated Apr. 18, 2007.

*Primary Examiner*—Zarni Maung
(74) *Attorney, Agent, or Firm*—Jacobson Holman PLLC

(57) ABSTRACT

A service system (1) comprises a service core (1(*f*)) and an interface (1(*d*)) for interfacing with instant messaging clients (10). The service core (1(*f*)) controls interfacing with an instant messaging client to provide an interactive service according to an application and involving routing of multimedia content to the client (10). The system (1) is modal, dynamically interacting with a client to provide a desired service in a current mode for a user, the mode being an application state and associated group of user interactions. A mode database manager 1(*a*) maintains a persistent record of the mode of a service for a user. The service core (1(*f*)) interfaces with the mode database manager (1(*a*)) to allow a mode to persist through at least two instant messaging sessions involving interaction. A directory manager (1(*b*)) manages registered instant messaging users, and the mode database manager (1(*a*)) maintains mode status only for registered users. The system also comprises a presence compositor (1(*c*)) for publishing modes of services as users of a presence network, and some users are avatars displayed on client display screens and representing modes. A mail store manager (1(*e*)) is instructed by the service core (1(*f*)) to perform messaging operations according to service mode changes.

17 Claims, 8 Drawing Sheets

CONTENT AND SERVICE DELIVERY IN TELECOMMUNICATION NETWORKS

This is a national stage of PCT/1E2007/000005 filed Jan. 23, 2007, and published in English, claiming benefit of U.S. provisional application Ser. No. 60/761,357, filed Jan. 24, 2006.

FIELD OF THE INVENTION

The invention relates to content and service delivery in telecommunication networks.

PRIOR ART DISCUSSION

At present there is widespread use of application service providers (ASPs) for provision of services to Web users. The invention is directed towards providing for enhanced provision of services, particularly those involving delivery of content to users.

SUMMARY OF THE INVENTION

According to the invention, there is provided a service system comprising a service processing means and an interface for interfacing with a presence server for in turn interfacing with instant messaging clients, in which the service processing means comprises means for controlling interfacing with an instant messaging client to provide an interactive service according to an application and involving routing of multimedia content to the client.

In one embodiment, the system is modal, dynamically interacting with a client to provide a desired service in a current mode.

In one embodiment, a mode of a service comprises a state of an application and an associated group of allowed user interactions.

In one embodiment, the processing means comprises a service core and a mode database manager for maintaining a persistent record of the mode of a service.

In one embodiment, the service core interfaces with the mode database manager to allow a mode to persist through at least two instant messaging sessions of a particular client involving interaction.

In one embodiment, the service system further comprises a directory manager for managing registered instant messaging users, and the mode database manager maintains mode status only for registered users.

In a further embodiment, the processing means comprises a presence compositor for publishing modes of services as virtual users of a presence network, and a service core for interfacing with the presence compositor.

In one embodiment, the processing means provides an avatar for display on a client display screen, the avatar representing a virtual user recorded by the presence compositor as a virtual user of the presence network and representing a mode.

In one embodiment, the processing means treats selection of the virtual user by a client as selection of a service in a mode.

In one embodiment, the processing means makes the virtual user available as a buddy of a plurality of users as a mechanism to allow said plurality of users to have access to said service in said mode.

In one embodiment, the processing means controls interfacing with external media servers to retrieve multimedia content for providing the services.

In one embodiment, the processing means comprises a media session manager for interfacing with an external media server.

In another embodiment, the processing means invokes an external application server to execute application logic programs for providing a service.

In one embodiment, the processing means invokes an external application server to execute application logic programs for providing a service; and wherein the service core interfaces with an external application server, and with a media session manager for media session management.

In one embodiment, the service core comprises means for instructing the presence compositor to change a service mode.

In one embodiment, the service core comprises means for, upon initialisation, invoking the presence compositor to publish users in a presence network, including virtual users representing service modes, and the presence compositor interfaces with an external presence server to publish said users.

Preferably, the service core comprises means for invoking the presence compositor to change publication of virtual users in response to service mode changes.

In one embodiment, the service system comprises means for triggering a mode change.

In one embodiment, the service core determines requirement for a mode change in response to an input from the application server, and wherein the service core instructs the media session manager of the mode change.

In one embodiment, the processing means further comprises a mail store manager for interfacing with a mail store for client message deposits, retrieval data, and message inventory.

In one embodiment, the service core instructs the mail store manager to perform an operation for a mailbox and report the result of this action.

In one embodiment, the service core instructs the mail store manager in response to a notification from an application that a mode change has occurred.

In another aspect, the invention provides a computer readable medium comprising software code for implementing operations of the processing means of any service system as defined above when executing on a digital processor.

GLOSSARY

DM: Directory manager
GUI: Graphical User Interface
HTTP: Hypertext Transfer Protocol
IM: Instant Messaging
IMAP: Internet Message Access Protocol
IP: Internet Protocol
LDAP: Lightweight Directory Access Protocol
MDM: Mode database manager
MM: media session manager
MMA: Multimodal Multimedia Application
PC: Presence compositor
SC: Service core
SM: mail store manager
SIMPLE: Session Initiation Protocol for Instant Messaging and Presence Leveraging Extensions
SIP: Session Initiation Protocol
UC: User client
VXML: Voice Extensible Markup Language (Voice XML)
XMPP: Extensible Messaging and Presence Protocol

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which.

DESCRIPTION OF THE EMBODIMENTS

Figure 1:
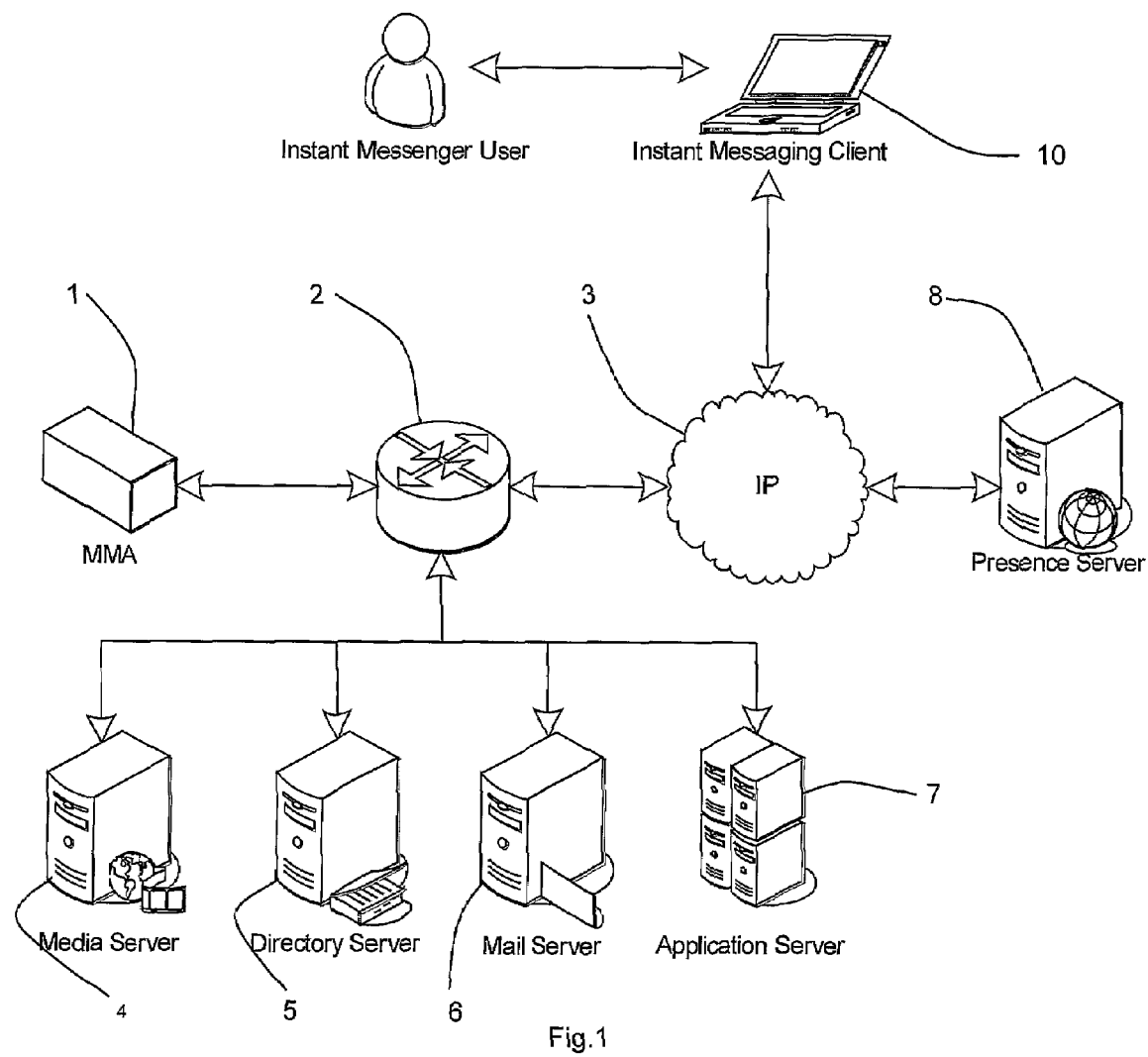
FIGS. 1 and 2 are diagrams showing linking of a multimodal multimedia application service system of the invention and external servers.

Referring to FIG. 1 a multimodal multimedia application (MMA) service system 1 is linked via switches 2 and an IP network 3 to third party servers namely a media server 4, a directory server 5, a mail server 6, and an application server 7. The system 1 is also connected to a presence server 8 via the IP network 3. The system 1 interfaces (via the presence server 8) with instant messaging ("IM") clients 10 (only one of which is shown) running on user computers or mobile devices. The system 1 interacts with the third party servers 4 to 7 and utilises their capabilities to provide value added services to the IM clients 10.

The system 1 performs content aggregation and service aggregation over an instant messaging interface. It enables service providers as well as enterprises to deploy value added services that are integrated with a presence network. Subscribers access these value added services over the instant messenger clients 10 to receive a rich, interactive, and multimodal experience. The term "multimodal" means an inherently stateful nature of aggregation. As the user interacts with the service, the "mode" of the service may alter from the perspective of that user. An application has a "state" and the service has a mode which is a combination of a state and a set of appropriate interactions that correspond to that state. To put it simply, mode A might mean that an application is in state X and the user can perform actions Q, R, and S, whereas mode B might mean that the application is in state Y and the user can perform actions D, E, and F. A mode is represented as a virtual user buddy represented by an avatar appearing on an instant messaging buddy list. This buddy may also appear on the buddy lists of other users, thereby giving a service in a particular mode simultaneously to multiple users. Thus, from the user's perspective, continued presence of the avatar means that the service mode is retained. The virtual user represented by the avatar is a virtual user of a presence network managed by the presence server 8.

Also, a mode is retained across multiple sessions if the associated state and interaction conditions remain. This mode persistency is achieved with use of a mode database manager, described in more detail below.

The feature of the system 1 publishing presence of a service as a user of a presence network is very advantageous. It makes use of an aspect of instant messaging in a manner which is completely different from the conventional use and is highly advantageous. By employing the instant messaging mechanism of maintaining and displaying lists of instant messaging buddies, the service system 1 is able to provide a wide range of services with real time information for the user of all current modes.

Due to the link with the presence server 8, the system 1 exists within a presence network and may communicate with the service providing servers 4 to 7 to facilitate an interactive multimedia application experience (the "service") delivered over an instant messaging interface (the "client").

The servers 4 to 7 may be referred to as a "framework". The service makes use of the inherent text-message, audio, video, and presence capabilities of the network such that a user of the client will be able to access and inspect the mode of the service through the client. The mode of the service reflects data such that the user will interact with the service through the client in a manner congruent with the mode.

"MMA" is a generic term used to describe any multimodal multimedia application that interacts with the framework, and thus there may be many different types of services provided by different MMAs. For example, one application may be sports oriented, while another application may be related to "on-line dating", while another application may be a front-end to a unified communications system.

Users interact with the service through traditional modes of communication present in popular clients today: voice, video, and text-messaging (the "interaction"). Through interaction, the service reacts in a manner congruent to the nature of the specific application, and in doing so may facilitate a change in the mode of the service.

Modality of the service may be personal and unique to a specific user as modality is contingent upon the interaction by the user with the service. Thus, user A may find the mode of the service in state Y as a result of interaction Q, while User B may find the mode of the service in state X as a result of interaction R.

Modality of the service may be communal if the nature of the application is community based. In this case, modality is contingent upon the usage of and interaction with the service by a community of users. Thus, users A and B may find the mode of the service in state X contingent upon specific interaction by users A and B.

Figure 2:
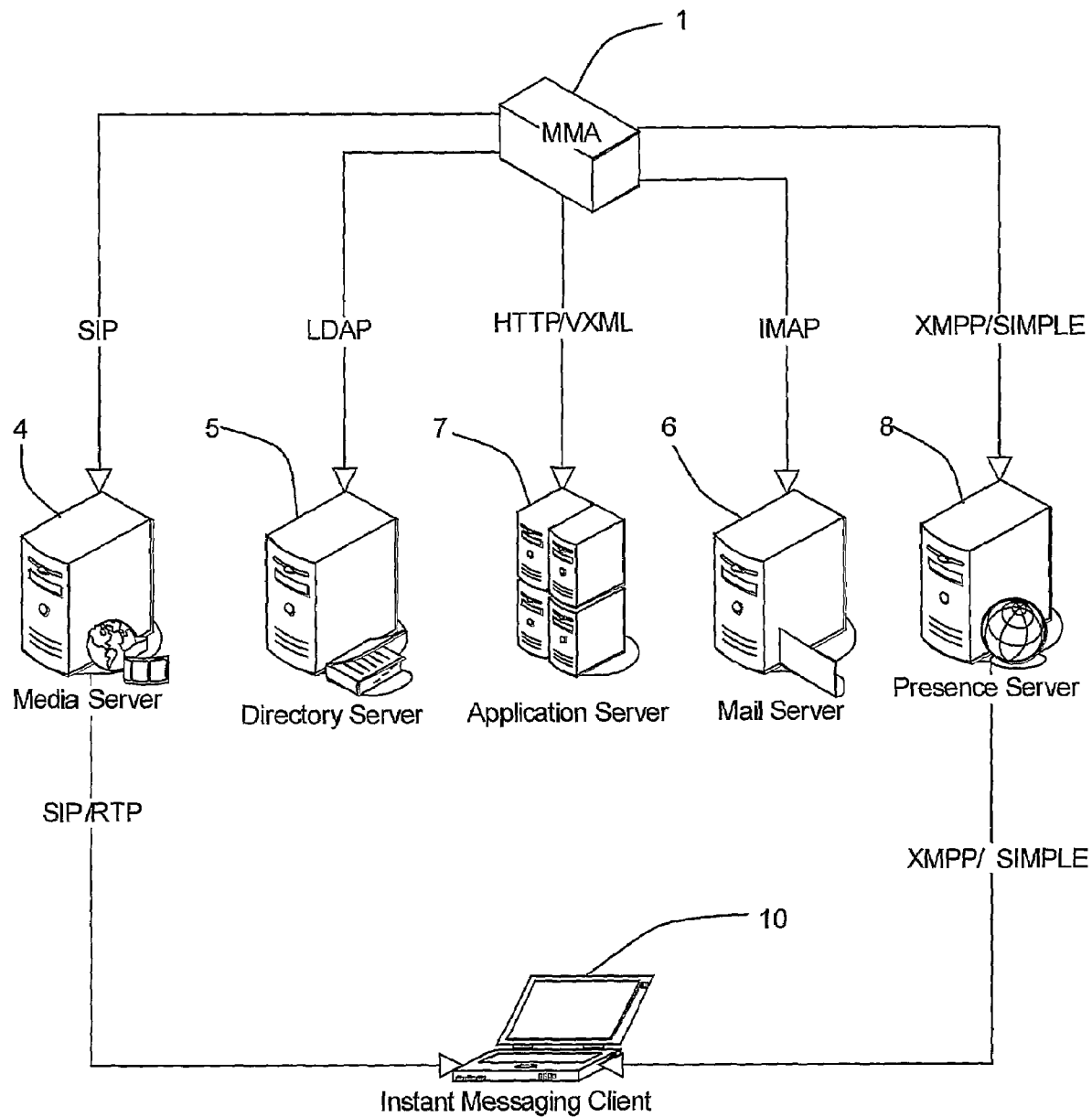

Referring to FIG. 2, the system 1 has interfaces which allow it to communicate with the servers 4 to 8 provided by the network, such as:

Media Session Management (e.g., SIP)
Directory Access (e.g., LDAP)
Presence/Instant Messaging Session Control (e.g., XMPP, SIMPLE)
Mail Store Access (e.g., IMAP)
Application Invocation (e.g., VXML/HTTP).

Figure 3:
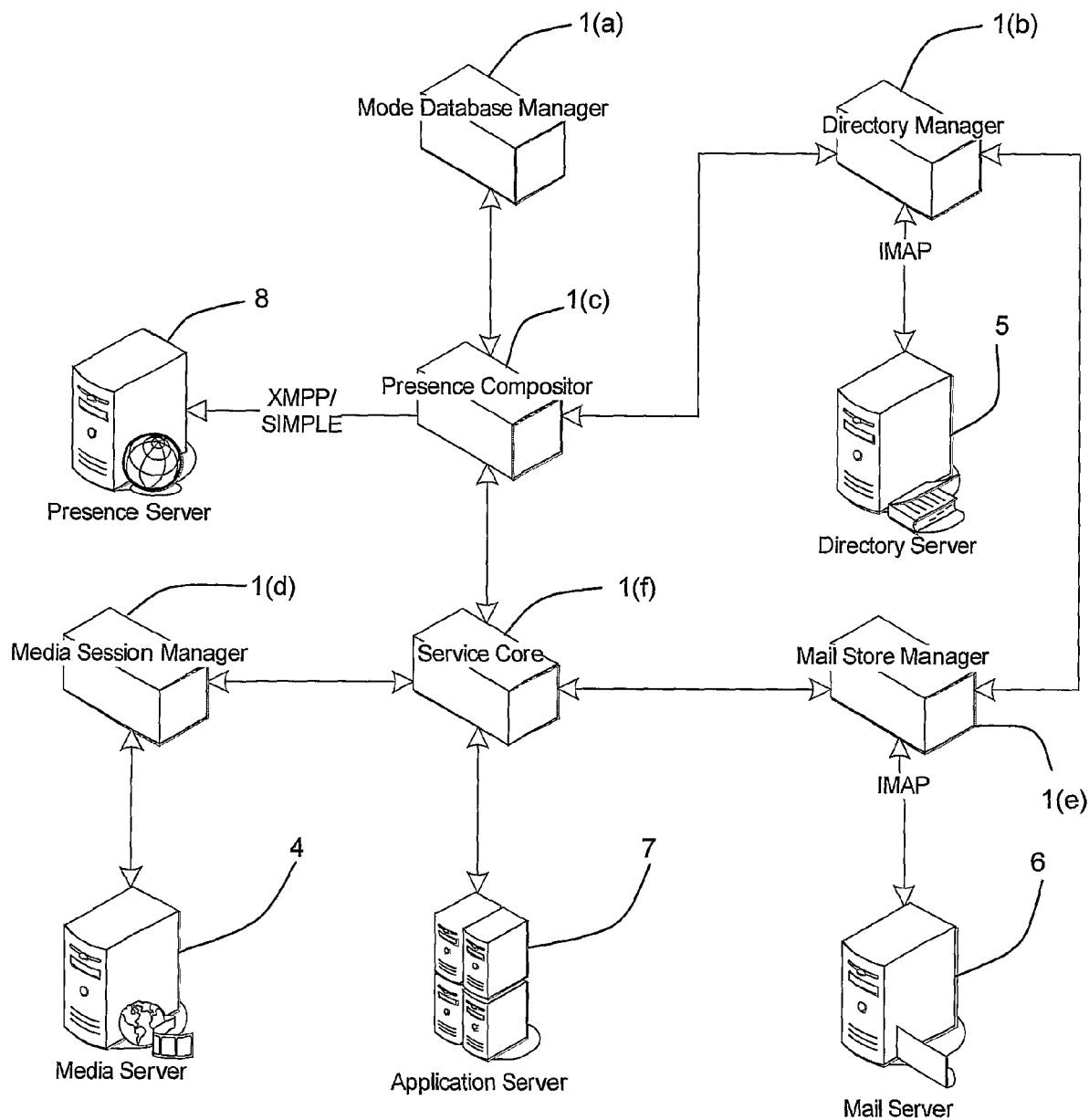
FIG. 3 is a diagram showing the service system in more detail.

The system 1 comprises a conglomerate of six logical entities, shown in FIG. 3, which together provide the service. These are described in more detail below. Interaction with the client is via the presence server 8, as is conventional for instant messaging.

Mode Database Manager (MDM) (1(a))

This entity is responsible for storing and maintaining a persistent cache of the mode of the service for each unique user. The MDM 1(a) encapsulates a persistent database allowing the mode to persist through multiple instant messaging sessions involving interaction. Thus, if user X engages in session N which results in mode Q and then ends the session, user X will find the service in mode Q when session N+1 is started.

Directory Manager (DM) (1(b))

This entity is responsible for managing the set of users with regard to their allowed (provisioned) access levels and rights with regard to the application. For example, user A is a legitimate user of the application (a "subscriber"), and thus will have an entry in the directory server managed by the DM.

Consequently, user B is not a subscriber, and thus will not have an entry in the directory server. Furthermore while user C is a subscriber, he is behind on his Subscription fees, and therefore the entry in the directory indicates that user C is not allowed to access the service.

Presence Compositor (PC) (1(c))

This entity is responsible for publishing the mode of the service for each subscriber identified by the DM, to the presence server 8. All requests for mode are first validated by the DM 1(b) on behalf of the PC 1(c). All changes in mode are routed through the PC, and consequently stored in the MDM 1(a).

Media Session Manager (MM) (1(d))

This entity is responsible for interfacing with the media server 4 and maintaining and associating the appropriate media server handles for all sessions.

Mail Store Manager (SM) (1(e))

This entity is responsible for interfacing with the mail server 6 in the context of message deposits, retrieval, and message inventory. Where appropriate, the application may make use of the mailbox for a subscriber, and the SM 1(e) facilitates this operation. The SM interacts with the DM 1(b) to gain knowledge of the specific details of a subscriber's mailbox.

Service Core (SC) (1(f))

The SC invokes the application server 7 and orchestrates the behaviour of the PC 1(c), the MM 1(d), and SM 1(e). Based upon the application, the SC 1(f) may make the following requests to other logical entities in the MMA 1:

i. Instruct the PC 1(c) to alter the mode of the service.
  ii. Instruct the PC 1(c) to transmit a text message.
  iii. Instruct the SM 1(e) to perform an operation for a given mailbox and report the result of the action.
  iv. Instruct the MM 1(d) to play or receive multimedia for a given session.

The SC 1(f) may receive information in an unsolicited and solicited manner from other logical entities in the MMA 1:

i. Audio and video data may be received from the MM 1(d).
  ii. Text-message data may be received from the PC 1(c).
  iii. Copies of newly received messages may be received from the SM 1(e)
  iv. Other information pertaining to subscriber mailboxes may be received from the SM 1(e).

Figure 4:
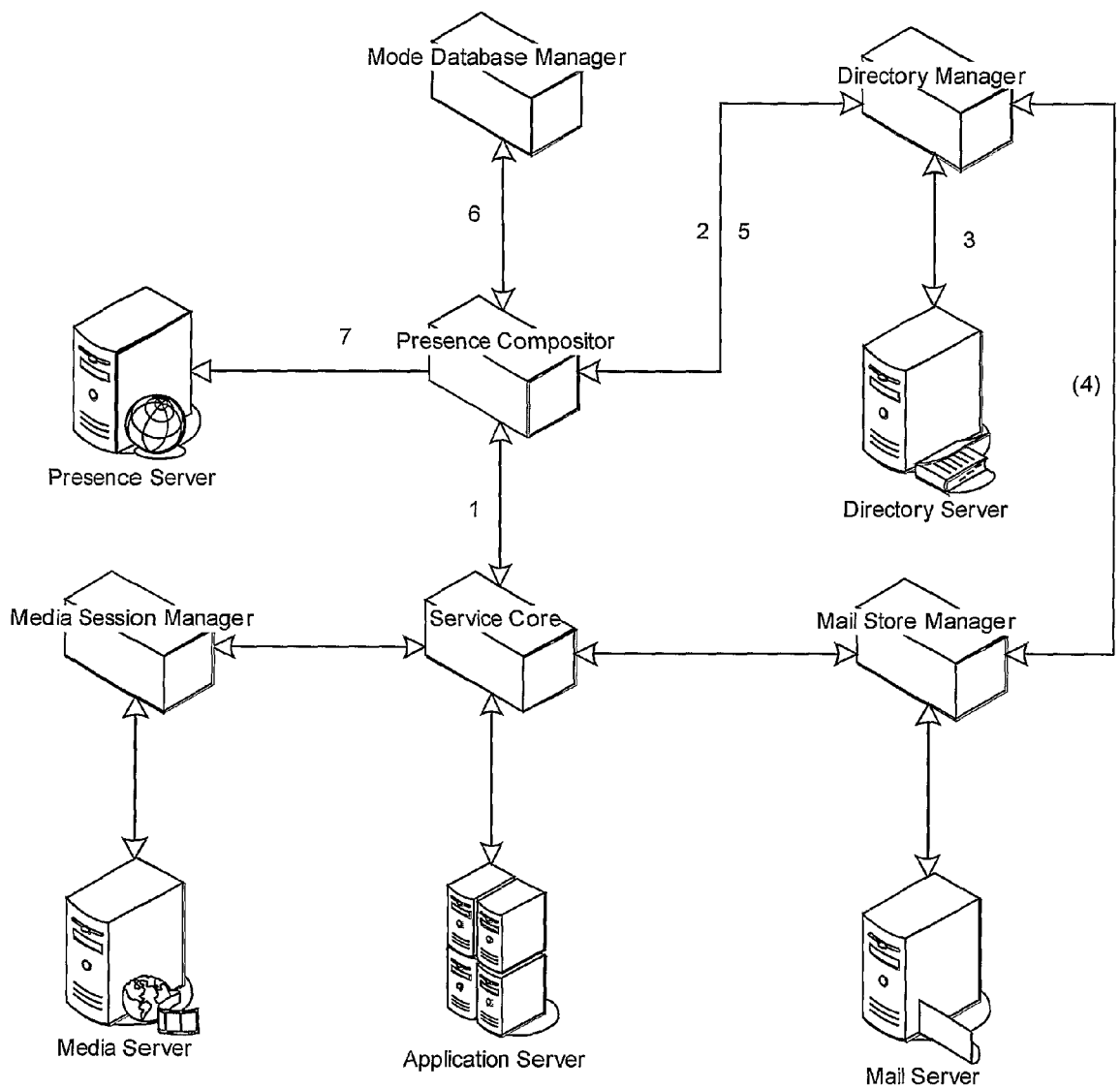
FIGS. 4 to 8 inclusive are diagrams illustrating operation of the service system.

Referring to FIG. 4, the following message transfers are shown:

1. Service core 1(f) is initialized and requests for the presence compositor 1(c) to populate service values to the presence server 8 of all valid service "buddies".
2. Presence compositor 1(c) requests subscriber information from the directory manager 1(b).
3. Directory manager 1(b) in turn retrieves subscriber information
4. (OPTIONALLY) If mail store state is a part of published service presence, then mail store state is also retrieved and aggregated with the data obtained in step 3.
5. Directory manager 1(b) fulfils its obligation to the presence compositor, 1(c), delivering one or more user profiles retrieved from the directory server 5.
6. Current state of the service for a given subscriber is retrieved from the mode database manager 1(a).
7. Service presence is published to the presence server 8.

Figure 5:
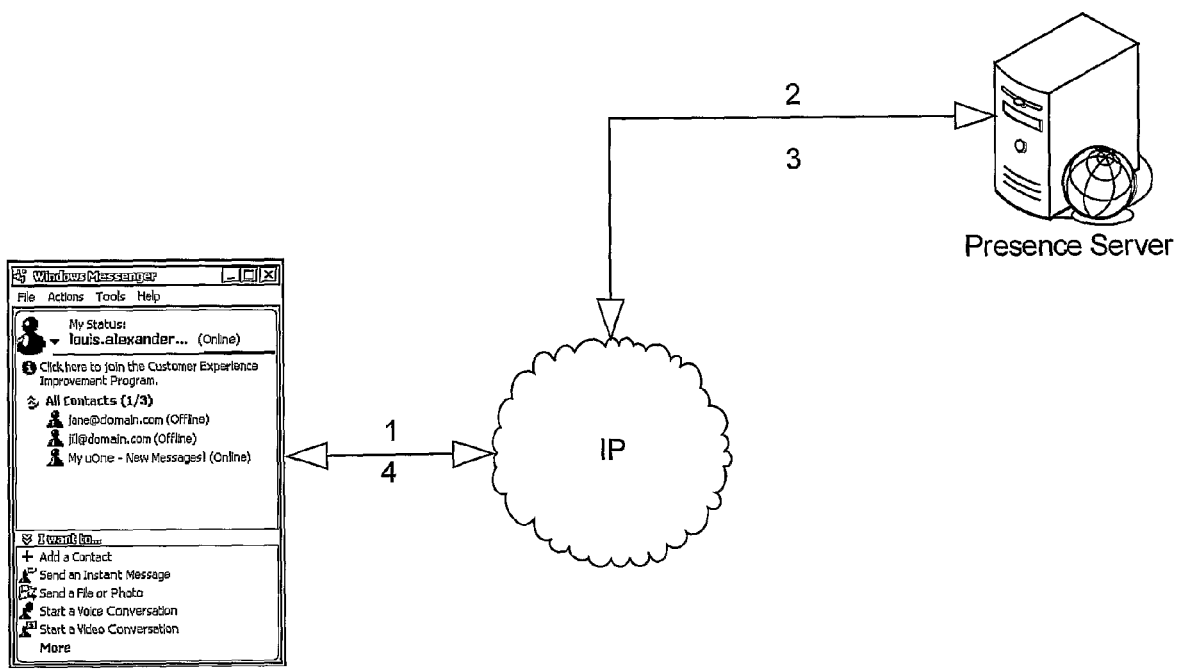

Referring to FIG. 5 the following occurs:
1. Subscriber opens a connection to the presence server 8 over the network.
2. Request for the presence of all "buddies" on the subscriber's contact list is terminated on the presence server 8.
3. Presence for all requested "buddies" (including assorted service state) is published to the contact address specified in the request in step 2.
4. Presence information is terminated at the subscriber's client 10, and is populated in the GUI associated with the client 10.

Figure 6:
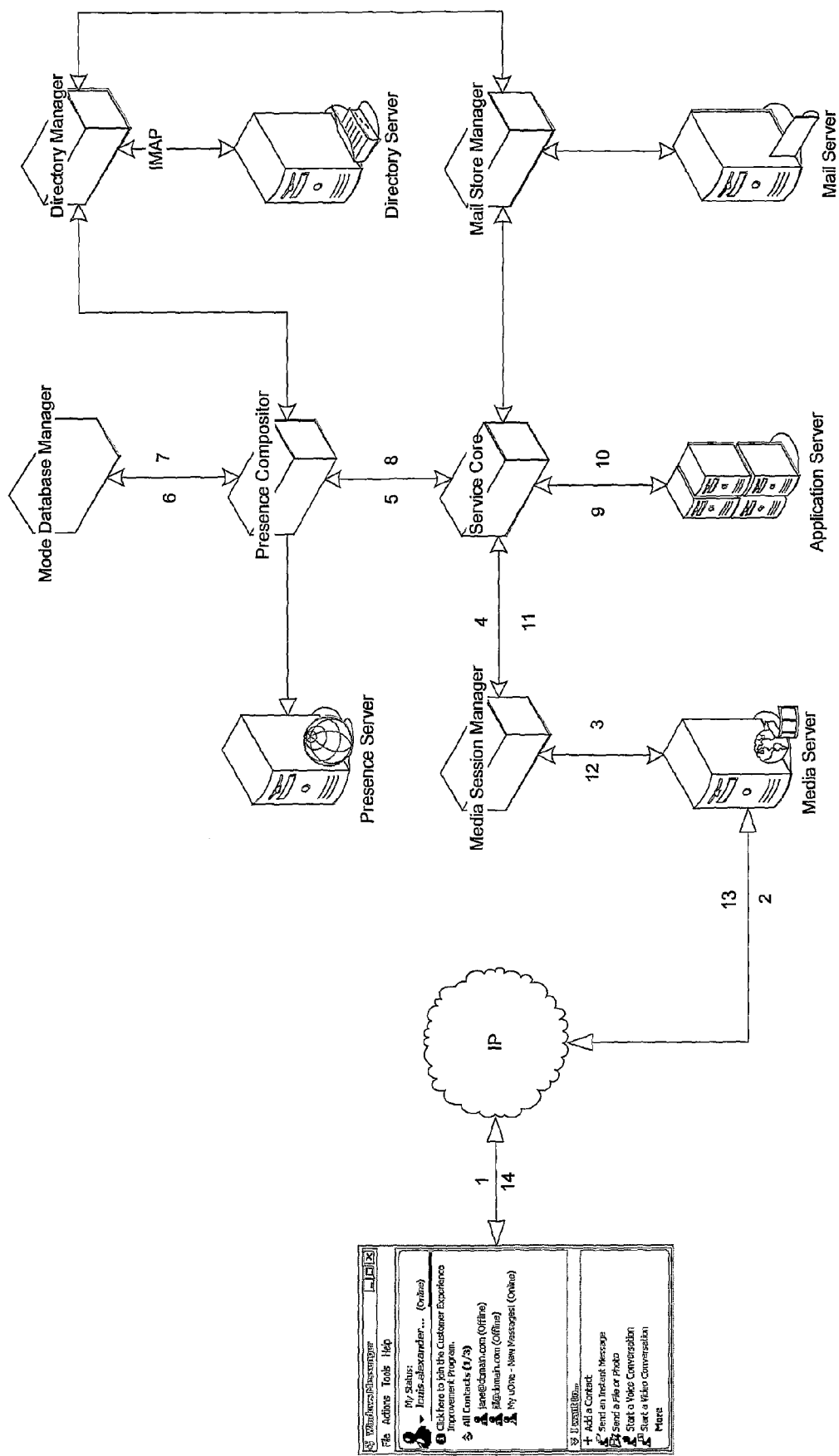

Referring to FIG. 6, the following occurs:
1. User initiates interaction with the Buddy representing the service (any set of {text, voice, video}).
2. Interaction is terminated at the media server 4.
3. Media server 4 passes interaction to the media session manager 1(d).
4. Media session manager 1(d) passes interaction to the service core 1(f).
5. Service core 1(f) must query the presence compositor 1(c) for current state of the service (may impact validity of interaction).
6. Presence compositor 1(c) queries mode database manager 1(a) for current service state.
7. Service state is returned to the presence compositor 1(c).
8. Service state is returned to the service core 1(f) and aggregated with the interaction.
9. The combination of service state and interaction is passed to the application server 7.
10. Application server 7 logic is executed and instructions for resulting interaction are sent to the service core 1(f) (if interaction+service state resulted in application logic requiring interfacing with the mail server 6, the service core 1(f) would leverage the mail store manager 1(e) at this point).
11. Service core 1(f) passes resulting interaction to the media session manager 1(d).
12. Media session manager 1(d) controls the media server 4 to produce the desired interaction.
13. Resulting interaction is sent over the network to the subscriber's client 10.
14. Interaction is terminated at the subscriber's client 10.

Figure 7:
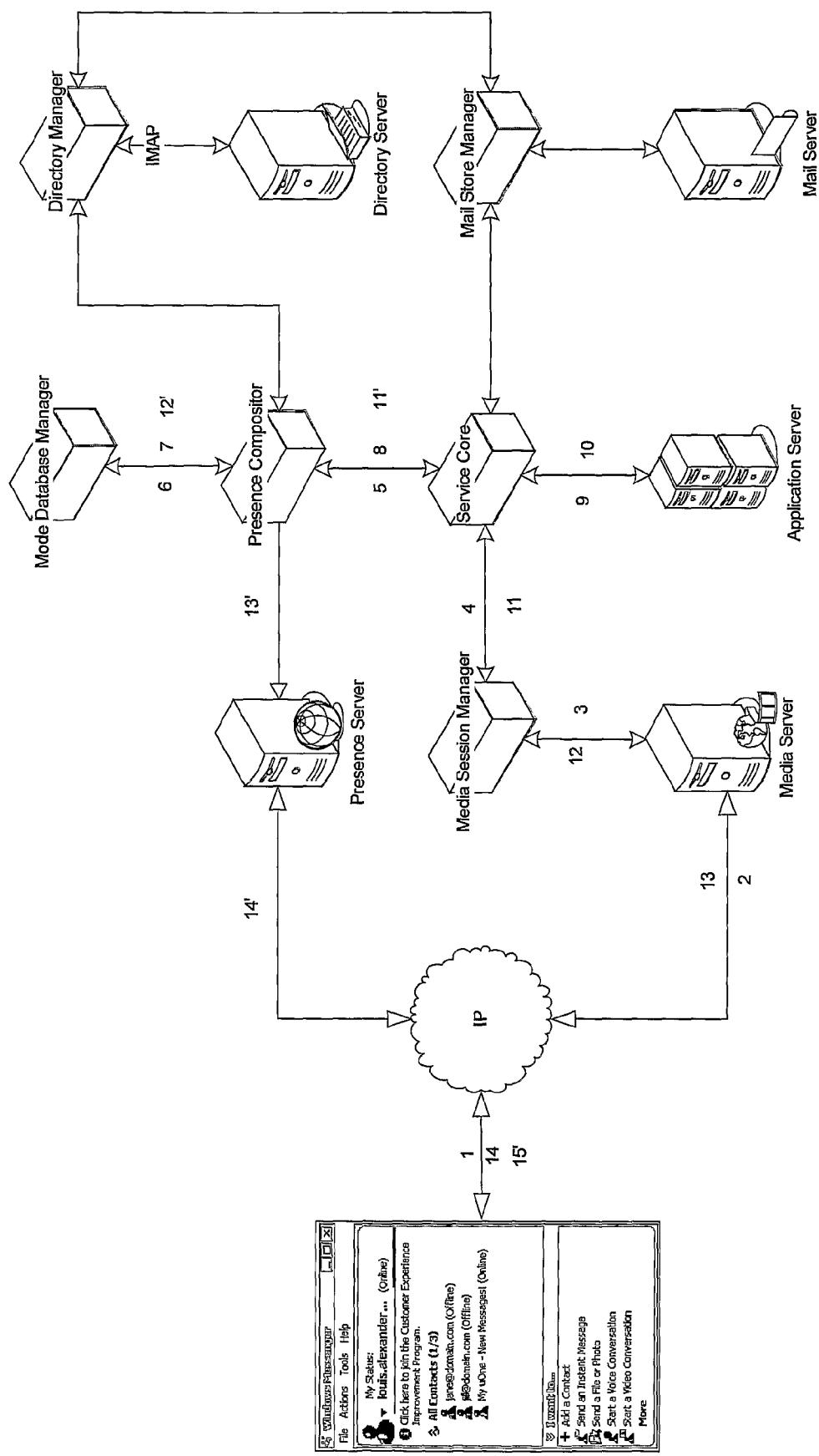

Referring to FIG. 7 the following occurs:

(Note: Step X and Step X' occur in parallel)
1. User initiates interaction with the buddy representing the service (any set of {text, voice, video}).
2. Interaction is terminated at the media server 4.
3. Media server 4 passes interaction to the media session manager 1(d).
4. Media session manager 1(d) passes interaction to the service core 1(f).
5. Service core 1(f) must query the presence compositor 1(c) for current state of the service (may impact validity of interaction).
6. Presence compositor 1(c) queries mode database manager 1(a) for current service state.
7. Service state is returned to the presence compositor 1(c).
8. Service state is returned to the service core 1(f) and aggregated with the interaction.
9. The combination of service state and interaction is passed to the application server 7.
10. Application server logic is executed and instructions for resulting interaction are sent to the service core 1(f) (if interaction+service state resulted in application logic requiring interfacing with the mail server 6, the service core 1(*f*) would leverage the mail store manager 1(*e*) at this point).

11. Service core 1(*f*) passes resulting interaction to the media session manager 1(*d*). 11'. Service core 1(*f*) passes resulting state to presence compositor 1(*c*).
12. Media session manager 1(*d*) controls the media server 4 to produce the desired interaction.
12'. Presence compositor 1(*c*) stores modified service state with the mode database manager 1(*a*).
13. Resulting interaction is sent over the network to the subscriber's client 10.
13'. Presence compositor 1(*c*) publishes new service state to presence server 8.
14. Interaction is terminated at the subscriber's client.
14'. Presence server 8 publishes new service state to subscribed clients (the subscriber).
15'. Presence updates are terminated on the subscriber's client.

Figure 8:
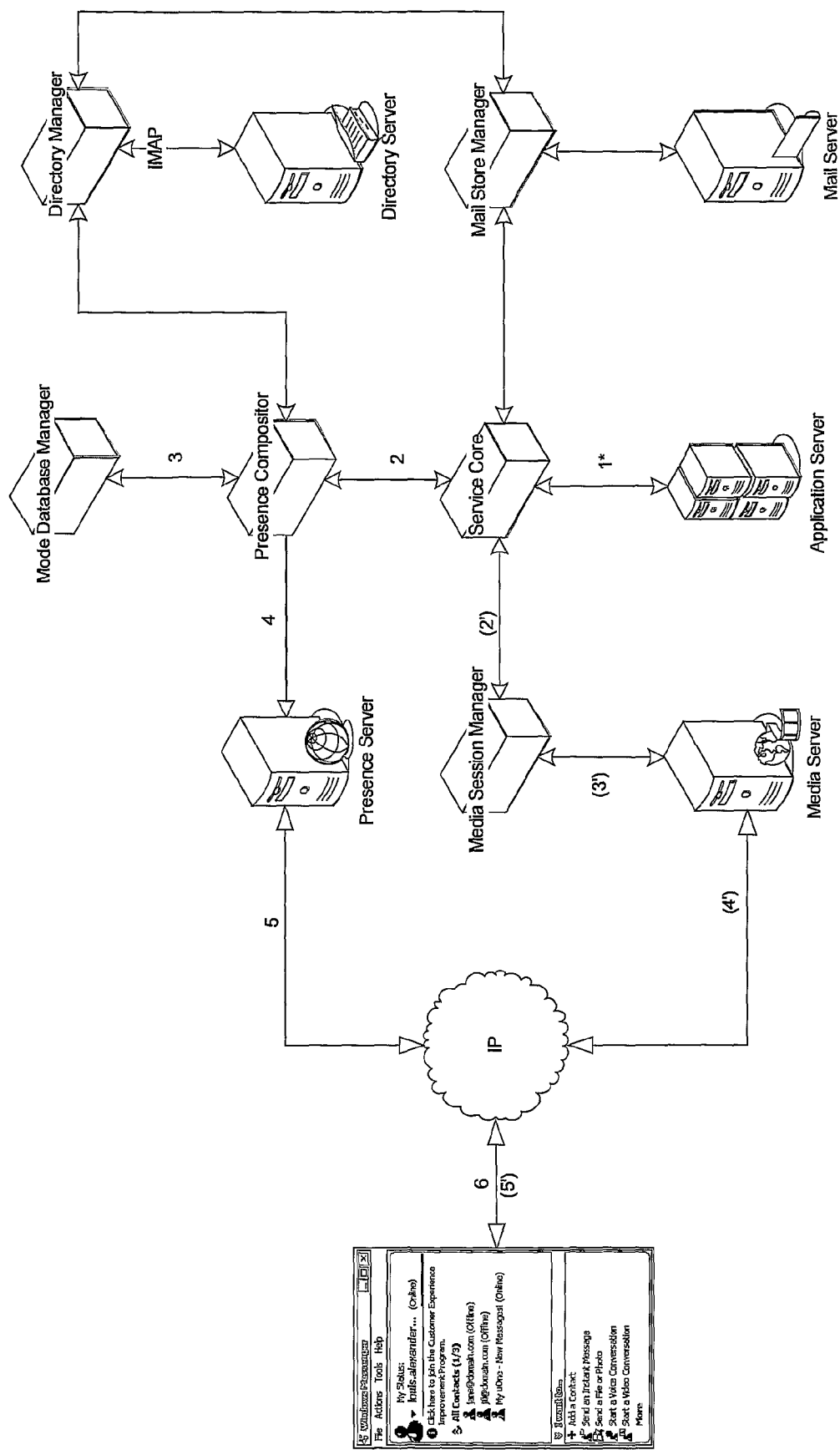

Referring to FIG. 8 the following occurs:

(Note: Step X and Step X' occur in parallel)
1*. The state of the service changes as a function of data received from an external interface. Based on application logic, the resulting state is published to the service core 1(*f*). Additionally, a MMA initiated interaction may result (see (2')).
2. The service core 1(*f*) requests the presence compositor 1(*c*) to update the state as specified by the service core 1(*f*).
2'. (OPTIONALLY) If the service state change results in an MMA initiated interaction, the service core 1(*f*) communicates said interaction to the media session manager 1(*d*).
3. Presence compositor 1(*c*) stores resulting state in the mode database manager 1(*a*).
3'. (OPTIONALLY) The media session manager 1(*d*) commands the media server 4 to initiate an interaction on behalf of the service.
4. Presence compositor 1(*c*) publishes the resulting state of the service to the presence server 8.
4'. (OPTIONALLY) The media server 4 transmits the interaction to the subscriber's client over the network.
5. Updated presence information about the service is published by the presence server 8 to the subscriber's client 10 over the network.
51'. (OPTIONALLY) The interaction is terminated to the subscriber's client.
6. The presence updates are terminated to the subscriber's client.

In one embodiment, the system 1 serves the purpose of providing a personalized UC service to the user over Windows Messenger 5.1. It uses the following functionality to provide the framework:

uOneXP Application Server
TNT Media Server
Sun One Directory Server
Sun One Mail Store The mode of the service allows for the subscriber to double click on the buddy and begin a voice or voice/video session. This allows the subscriber to call into his mailbox, check his voice/video messages, and perform other mailbox related operations through interaction. This system 1 also implements the ability to receive text-message interaction from the PC 1(*c*) for the purpose of navigation through the application.

Changes in mode occur based on the usage of a SETINDICATOR TAP command by the application. When the application decides to toggle the "new message" state of a subscriber's mail box, the application issues the SETINDICATOR command to the SC 1(*f*), which in turn publishes the result of the operation to the PC 1(*c*). This may trigger a change in the mode of the personalized service if there was a state change (e.g. on–>off or off–>on).

The mode indicates the state of the mailbox. If there are new messages, the mode will display this fact.

This invention is of particular benefit in the broadband media services market field. Currently if a broadband provider wishes to provide a multimedia rich and interactive service, they must implement a web based application or a "set-top box" application. Introduction of the service system 1 to the broadband market gives service providers additional options for the rapid generation of revenue-generating services that can appeal to a broad market. Instant messaging is a very rapidly growing technology that is finding penetration in a large variety of users from teenagers to business professionals.

The invention is not limited to the embodiments described but may be varied in construction and detail. For example, in alternative embodiments the service system may incorporate the full service-processing functionality in a different configuration to that illustrated, and indeed the full service system may be hosted on only one hardware server. For example, the service core may not be a physically discrete item, and may instead be a suite of programs co-hosted with other programs. Also, the user client may be any user device having instant messaging and processing capabilities.

The invention claimed is:

1. A service system comprising a service processing means and an interface for interfacing with a presence server for in turn interfacing with instant messaging clients, wherein:
   the service processing means comprises means for controlling interfacing with an instant messaging client to provide an interactive service according to an application and involving routing of multimedia content to the client;
   the system is modal, dynamically interacting with a client to provide a desired service in a current mode, and a mode of a service comprises a state of an application and an associated group of allowed user interactions;
   the processing means comprises a service core and a mode database manager for maintaining a persistent record of the mode of a service; and
   the service core interfaces with the mode database manager to allow a mode to persist through at least two instant messaging sessions of a particular client involving interaction.

2. The service system as claimed in claim 1, further comprising a directory manager for managing registered instant messaging users, and the mode database manager maintains mode status only for registered users.

3. The service system as claimed in claim 1, wherein the processing means comprises a presence compositor for publishing modes of services as virtual users of a presence network, and a service core for interfacing with the presence compositor.

4. The service system as claimed in claim 3, wherein:
   the processing means provides an avatar for display on a client display screen, the avatar representing a virtual user recorded by the presence compositor as a virtual user of the presence network and representing a service in a mode;
   the processing means treats selection of the virtual user by a client as selection of a service in a mode; and the processing means retains continued presence of the virtual user represented by the avatar as an indication that the service in a mode is retained.

5. The service system as claimed in claim 3, wherein;
the processing means provides an avatar for display on a client display screen, the avatar representing a virtual user recorded by the presence compositor as a virtual user of the presence network and representing a service in a mode;
the processing means treats selection of the virtual user by a client as selection of a service in a mode; and wherein the processing means retains continued presence of the virtual user represented by the avatar as an indication that the service in a mode is retained; and
the processing means makes the virtual user available as a buddy of a plurality of users as a mechanism to allow said plurality of users to have access to said service in said mode.

6. The service system as claimed in claim 1, wherein the processing means controls interfacing with external media servers to retrieve multimedia content for providing the services.

7. The service system as claimed in claim 1, wherein the processing means controls interfacing with external media servers to retrieve multimedia content for providing the services; and the processing means comprises a media session manager for interfacing with an external media server.

8. The service system as claimed in claim 1, wherein the processing means controls interfacing with external media servers to retrieve multimedia content for providing the services; and invokes an external application server to execute application logic programs for providing a service.

9. The service system as claimed in claim 1, wherein:
the processing means comprises a presence compositor for publishing modes of services as virtual users of a presence network, and a service core for interfacing with the presence compositor; and invokes an external application server to execute application logic programs for providing a service; and
the service core interfaces with an external application server, and with a media session manager for media session management.

10. The service system as claimed in claim 1, wherein the processing means comprises a presence compositor for publishing modes of services as virtual users of a presence network, and a service core for interfacing with the presence compositor; and wherein the service core comprises means for instructing the presence compositor to change a service mode.

11. The service system as claimed in claim 1, wherein:
the processing means comprises a presence compositor for publishing modes of services as virtual users of a presence network, and a service core for interfacing with the presence compositor; and
the service core comprises means for, upon initialisation, invoking the presence compositor to publish users in a presence network, including virtual users representing service modes, and the presence compositor interfaces with an external presence server to publish said users.

12. The service system as claimed in claim 11, wherein the service core comprises means for invoking the presence compositor to change publication of virtual users in response to service mode changes.

13. The service system as claimed in claim 1, wherein the service system comprises means for triggering a mode change.

14. The service system as claimed in claim 1, wherein:
the processing means controls interfacing with external media servers to retrieve multimedia content for providing the services; and invokes an external application server to execute application logic programs for providing a service; and
the service core determines requirement for a mode change in response to an input from the application server, and
the service core instructs the media session manager of the mode change.

15. The service system as claimed in claim 1, wherein the processing means further comprises a mail store manager for interfacing with a mail store for subscriber message deposits, retrieval of data, and message inventory, and wherein a mode indicates the state of a subscriber's mailbox.

16. The service system as claimed in claim 1, wherein the processing means further comprises a mail store manager for interfacing with a mail store for subscriber message deposits, retrieval of data, and message inventory, and wherein a mode indicates the state of a subscriber's mailbox; and wherein the service core instructs the mail store manager to perform an operation for a mailbox and report the result of this action.

17. The service system as claimed in claim 16, wherein the service core instructs the mail store manager in response to a notification from an application that a mode change has occurred.

* * * * *